United States Patent
Choi et al.

(10) Patent No.: US 11,559,784 B2
(45) Date of Patent: Jan. 24, 2023

(54) SUPERABSORBENT POLYMER AND PREPARATION METHOD THEREOF

(71) Applicant: LG Chem, Ltd., Seoul (KR)

(72) Inventors: Yong Seok Choi, Daejeon (KR); Yeon Woo Hong, Daejeon (KR); Eunji Shin, Daejeon (KR); Taebin Ahn, Daejeon (KR)

(73) Assignee: LG Chem, Ltd.

( * ) Notice: Subject to any disclaimer, the term of this patent is extended or adjusted under 35 U.S.C. 154(b) by 112 days.

(21) Appl. No.: 16/968,771

(22) PCT Filed: Nov. 7, 2019

(86) PCT No.: PCT/KR2019/015056
§ 371 (c)(1),
(2) Date: Aug. 10, 2020

(87) PCT Pub. No.: WO2020/122426
PCT Pub. Date: Jun. 18, 2020

(65) Prior Publication Data
US 2021/0008521 A1    Jan. 14, 2021

(30) Foreign Application Priority Data

Dec. 11, 2018 (KR) .......... 10-2018-0158919
Nov. 4, 2019 (KR) .......... 10-2019-0139625

(51) Int. Cl.
*B01J 20/26* (2006.01)
*B01J 20/24* (2006.01)
(Continued)

(52) U.S. Cl.
CPC ............ *B01J 20/267* (2013.01); *B01J 20/24* (2013.01); *B01J 20/261* (2013.01); *B01J 20/262* (2013.01);
(Continued)

(58) Field of Classification Search
None
See application file for complete search history.

(56) References Cited

U.S. PATENT DOCUMENTS 4,043,952 A    8/1977    Ganslaw et al.
4,076,663 A    2/1978    Masuda et al.
(Continued)

FOREIGN PATENT DOCUMENTS

EP    0579764 A1    1/1994
EP    1470905 A1    10/2004
(Continued)

OTHER PUBLICATIONS

Search Report from Japanese Application No. 2020-539707 dated Aug. 16, 2021. 12 pgs.
(Continued)

*Primary Examiner* — Joseph D Anthony
(74) *Attorney, Agent, or Firm* — Lerner, David, Littenberg, Krumholz & Mentlik, LLP

(57) ABSTRACT

Provided is a method of preparing a superabsorbent polymer. More particularly, provided is a method of preparing a superabsorbent polymer, the method capable of preparing the superabsorbent polymer maintaining excellent basic absorption performances such as centrifugal retention capacity, absorbency under load, etc. while also exhibiting an improved absorption rate.

10 Claims, 1 Drawing Sheet

(51) Int. Cl.
*B01J 20/28* (2006.01)
*B01J 20/30* (2006.01)

(52) U.S. Cl.
CPC ..... *B01J 20/28028* (2013.01); *B01J 20/3021* (2013.01); *B01J 20/3064* (2013.01); *B01J 20/3085* (2013.01)

(56) References Cited

U.S. PATENT DOCUMENTS

| | | | |
|---|---|---|---|
| 4,666,983 | A | 5/1987 | Tsubakimoto et al. |
| 4,818,598 | A | 4/1989 | Wong |
| 4,883,478 | A | 11/1989 | Lerailler et al. |
| 5,264,471 | A * | 11/1993 | Chmelir ............... A61L 15/20 524/36 |
| 5,977,429 | A | 11/1999 | Phillips et al. |
| 6,284,362 | B1 | 9/2001 | Takai et al. |
| 2003/0083423 | A1 * | 5/2003 | Wiercinski ........... C08L 101/14 524/502 |
| 2005/0137546 | A1 | 6/2005 | Joy et al. |
| 2006/0252899 | A1 * | 11/2006 | Himori ............... C08F 4/40 526/317.1 |
| 2013/0026412 | A1 | 1/2013 | Machida et al. |
| 2015/0252130 | A1 | 9/2015 | Loick et al. |
| 2015/0315321 | A1 | 11/2015 | Won et al. |
| 2016/0207226 | A1 | 7/2016 | Torii et al. |
| 2017/0137581 | A1 * | 5/2017 | Park .................. C08K 5/00 |
| 2017/0165637 | A1 | 6/2017 | Park et al. |
| 2018/0105655 | A1 | 4/2018 | Matsubara et al. |
| 2018/0185820 | A1 * | 7/2018 | Tada ............... B01J 20/3085 |
| 2018/0228671 | A1 | 8/2018 | Hwang et al. |
| 2018/0298132 | A1 | 10/2018 | Yorino et al. |
| 2019/0040593 | A1 * | 2/2019 | Tetrault ............... B32B 5/26 |
| 2020/0009529 | A1 | 1/2020 | Nam et al. |

FOREIGN PATENT DOCUMENTS

| | | |
|---|---|---|
| EP | 1694372 A1 | 8/2006 |
| EP | 2930191 A1 | 10/2015 |
| EP | 3279238 A1 | 2/2018 |
| EP | 3290447 A1 | 3/2018 |
| EP | 3290448 A1 | 3/2018 |
| EP | 3312218 A1 | 4/2018 |
| EP | 3318595 A1 | 5/2018 |
| EP | 3321308 A1 | 5/2018 |
| EP | 3722352 A1 | 10/2020 |
| JP | S51136588 A | 11/1976 |
| JP | S58180233 A | 10/1983 |
| JP | S61016903 A | 1/1986 |
| JP | S61025212 A | 2/1986 |
| JP | S61062463 A | 3/1986 |
| JP | S61211305 A | 9/1986 |
| JP | S61257235 A | 11/1986 |
| JP | S63063723 A | 3/1988 |
| JP | H06507564 A | 9/1994 |
| JP | H0720549 B2 | 3/1995 |
| JP | H10045812 A | 2/1998 |
| JP | 2004339502 A | 12/2004 |
| JP | 2005015991 A | 1/2005 |
| JP | 2007514833 A | 6/2007 |
| JP | 2009185216 A | 8/2009 |
| JP | 2009242466 A | 10/2009 |
| JP | 2013034942 A | 2/2013 |
| JP | 201542909 A | 3/2015 |
| JP | 2015199958 A | 11/2015 |
| JP | 2016516877 A | 6/2016 |
| KR | 20000068290 A | 11/2000 |
| KR | 20150104536 A | 9/2015 |
| KR | 20160127938 A | 11/2016 |
| KR | 20160127939 A | 11/2016 |
| KR | 20170090185 A | 8/2017 |
| KR | 20170125388 A | 11/2017 |
| KR | 20170132799 A | 12/2017 |
| KR | 20180040404 A | 4/2018 |
| WO | 1987003208 A1 | 6/1987 |
| WO | 92018171 A1 | 10/1992 |
| WO | 02058841 A2 | 8/2002 |
| WO | 2005063313 A1 | 7/2005 |
| WO | 2011126079 A1 | 10/2011 |
| WO | 2015030129 A1 | 3/2015 |
| WO | 2016158975 A1 | 10/2016 |
| WO | 2016204302 A1 | 12/2016 |

OTHER PUBLICATIONS

International Search Report for Application No. PCT/KR2019/015056 dated Mar. 3, 2020, 3 pages.
Odian, Principles of Polymerization, Second Edition, Copyright 1981 by John Wiley & Sons, Inc, p. 203.
Schwalm, UV Coatings; Basics, Recent Developments and New Applications, Dec. 21, 2006, p. 115, Elsevier Science.
Third Party Observation for International Application No. PCT/KR2019/015056, dated Apr. 7, 2021, 4 pages.
Extended European Search Report including Written Opinion for Application No. EP19896615 dated Feb. 19, 2021.
Buchholz, F., et al., "Modem Superabsorbent Polymer Technology", WILEY-VCH (1998). 44 pgs.
Third Party Observation for Application No. 19896615.2 dated Oct. 18, 2022. 9 pages.

* cited by examiner

[FIG. 1]
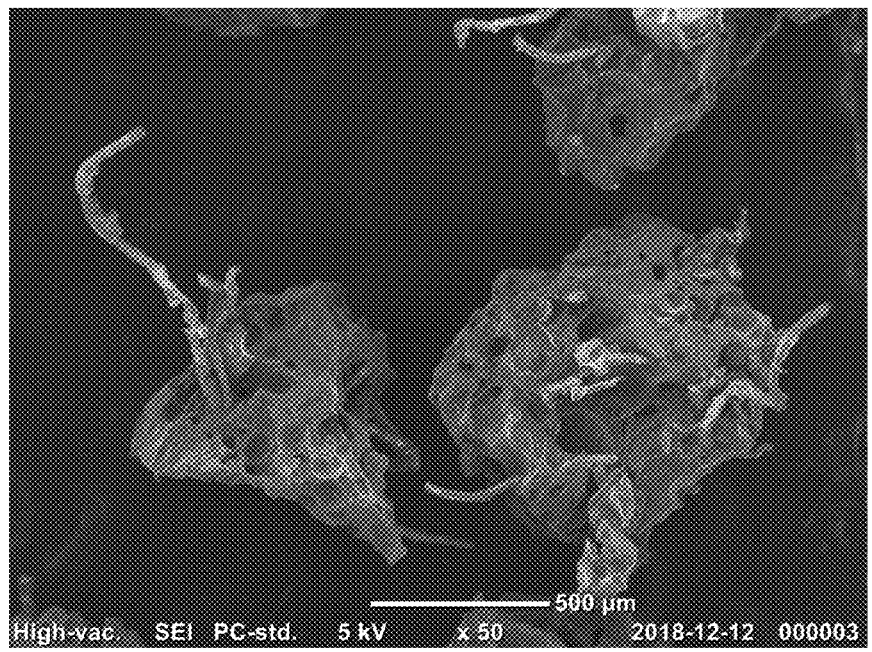
[FIG. 2]
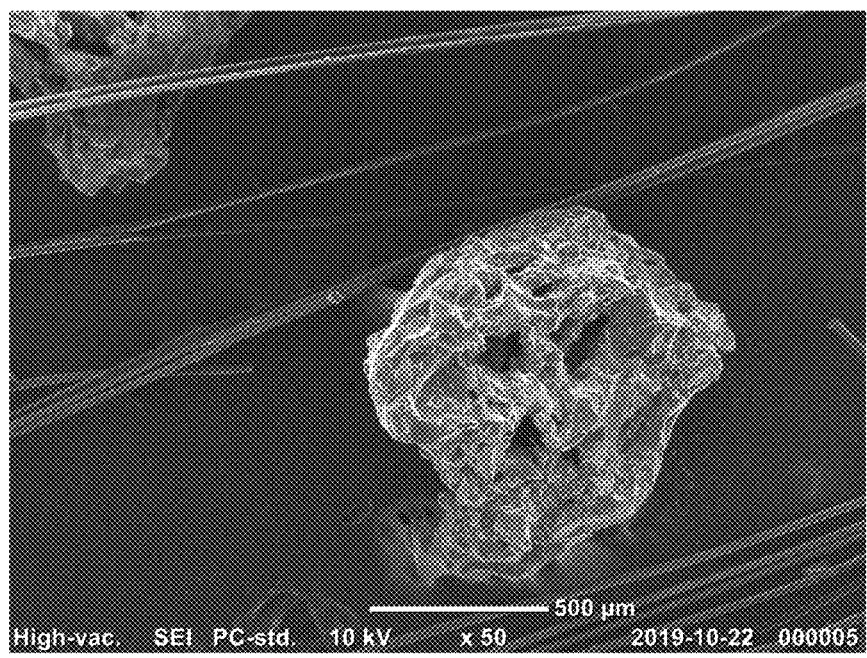

SUPERABSORBENT POLYMER AND PREPARATION METHOD THEREOF

CROSS-REFERENCE TO RELATED APPLICATIONS

The present application is a national phase entry under 35 U.S.C. § 371 of International Application No. PCT/KR2019/015056 filed on Nov. 7, 2019, which claims priority from Korean Patent Application Nos. 10-2018-0158919 and 10-2019-0139625, filed on Dec. 11, 2018 and Nov. 4, 2019, respectively, the disclosures of which are hereby incorporated by reference herein in their entirety.

TECHNICAL FIELD

The present invention relates to a superabsorbent polymer and a preparation method thereof. More particularly, the present invention relates to a method of preparing a superabsorbent polymer having excellent basic absorption performances while having an improved absorption rate.

BACKGROUND ART

A superabsorbent polymer (SAP) is a synthetic polymeric material capable of absorbing moisture from 500 to 1000 times its own weight. Since such superabsorbent polymers started to be practically applied in sanitary products, now they have been widely used not only for hygiene products such as disposable diapers for children, etc., but also for water retaining soil products for gardening, water stop materials for the civil engineering and construction, sheets for raising seedling, fresh-keeping agents for food distribution fields, materials for poultice or the like.

In most cases, these superabsorbent polymers have been widely used in the field of hygienic materials such as diapers, sanitary pads, etc. For these applications, superabsorbent polymers are required to exhibit high absorbency with respect to water, etc., and to have excellent absorption properties, for example, not to release the absorbed water even under an external pressure. Further, in recent years, an absorption rate for more quickly absorbing and storing a target solution such as moisture, etc. is more required. Basically, absorption of the superabsorbent polymer for an aqueous solution occurs on the surface thereof. Therefore, in order to improve the absorption rate, a method of widening the surface area of the superabsorbent polymer can be considered. In this connection, as a method of increasing the absorption rate, a method of reducing the particle size of the superabsorbent polymer or a method of forming a porous structure has been considered.

For example, a method of preparing a superabsorbent polymer by adding a foaming agent in order to form a porous structure in the superabsorbent polymer has been suggested. However, as the content of the foaming agent is higher, the absorption rate is improved to a certain level, but there is a problem in that the amount of fine powder of the superabsorbent polymer increases due to excessive foaming, and gel strength is lowered. In addition, as the particle size of the superabsorbent polymer decreases, its basic absorption properties tend to decrease. Thus, the known method has a limitation in improving the absorption rate while maintaining the basic absorbency.

DISCLOSURE

Technical Problem

To solve the above problems of the prior art, the present invention provides a method of preparing a superabsorbent polymer exhibiting excellent basic absorption performances such as water retention capacity (CRC) while exhibiting an improved initial absorption rate.

Technical Solution

To achieve the above object, the present invention provides a method of preparing a superabsorbent polymer, the method including the steps of:

a) mixing a water-soluble ethylenically unsaturated monomer, an internal crosslinking agent, and a polymerization initiator to prepare a monomer composition;

b) polymerizing the monomer composition to prepare a water-containing gel polymer;

c) chopping the water-containing gel polymer;

d) adding one or more fibers of a fluff pulp and a synthetic polymeric fiber to the chopped water-containing gel polymer and mixing them with each other to prepare a mixture;

e) chopping the mixture;

f) drying the mixture; and g) pulverizing the mixture.

The fiber may be included in an amount of 1 part by weight to 18 parts by weight with respect to 100 parts by weight of the water-containing gel polymer.

The fiber may have a length of 1 mm to 20 mm.

The fiber may have a width of 1 μm to 100 μm.

In one embodiment, water may be further added in one or more steps of the steps c) to e). In this regard, water may be added in an amount of 1 part by weight to 20 parts by weight with respect to 100 parts by weight of the water-containing gel polymer.

In one embodiment, the monomer composition may further include a foaming agent. In this regard, the monomer composition may further include one or more foam stabilizers selected from the group consisting of alkyl sulfate salts, alkyl sulfonate salts, alkyl phosphate salts, alkyl carbonate salts, polyethylene glycol alkyl ester, polypropylene glycol alkyl ester, glucoside alkyl ester, glycerol alkyl ester, and block-copolymers of polyethylene glycol and polypropylene glycol.

In one embodiment, the method may further include, after the step g), the steps of:

h) adding a surface crosslinking agent to the mixture obtained in the step g); and i) performing a surface crosslinking reaction.

In this regard, the surface crosslinking agent may be one or more selected from the group consisting of a polyhydric alcohol compound; an epoxy compound; a polyamine compound; a haloepoxy compound; a condensation product of a haloepoxy compound; an oxazoline compound; a mono-, di-, or polyoxazolidinone compound; a cyclic urea compound; a polyvalent metal salt; and an alkylene carbonate compound.

The surface crosslinking agent may be added in an amount of 0.001 part by weight to 5 parts by weight with respect to 100 parts by weight of the mixture.

Meanwhile, the present invention provides a superabsorbent polymer prepared by the above preparation method.

Specifically, the present invention provides a superabsorbent polymer including a base polymer particle including a crosslinked polymer which is obtained by crosslinking polymerization of a water-soluble ethylenically unsaturated monomer in the presence of an internal crosslinking agent, and one or more fibers of a fluff pulp and a synthetic polymeric fiber; and a surface-crosslinked layer which is formed on the surface of the base polymer particle, and is obtained by additionally crosslinking the crosslinked polymer via a surface crosslinking agent, wherein at least a portion of the fibers may be incorporated into the interior of the base polymer particle.

The superabsorbent polymer may have centrifugal retention capacity (CRC) of 25 g/g to 45 g/g, as measured in accordance with EDANA method WSP 241.3.

The superabsorbent polymer may have absorbency under load (AUL) at 0.3 psi of 25 g/g to 40 g/g, as measured in accordance with EDANA method WSP 242.3.

Further, according to one embodiment of the present invention, provided is a superabsorbent polymer composition including a superabsorbent polymer particle; and one or more fibers of a fluff pulp and a synthetic polymeric fiber, wherein at least a portion of the fibers may be incorporated into the interior of the superabsorbent polymer particle.

Effect of the Invention

A method of preparing a superabsorbent polymer according to the present invention may provide a high-quality superabsorbent polymer having excellent basic absorption performances such as centrifugal retention capacity, etc., while exhibiting an improved absorption rate.

Further, the method of preparing a superabsorbent polymer according to the present invention has high efficiency due to relatively simple processing steps, and therefore, it is possible to obtain a superabsorbent polymer having a high absorption rate.

BRIEF DESCRIPTION OF DRAWINGS

FIG. 1 is a scanning electron microscopy (SEM) image of a superabsorbent polymer prepared in Example 1; and FIG. 2 is a SEM image of a superabsorbent polymer prepared in Comparative Example 2.

BEST MODE FOR CARRYING OUT THE INVENTION

The terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components, or combinations thereof beforehand.

The present invention may be variously modified and have various forms, and specific examples of the present invention are explained in this description. However, it is not intended to limit the present invention to the specific examples and it must be understood that the present invention includes every modifications, equivalents, or replacements included in the spirit and technical scope of the present invention.

Hereinafter, a superabsorbent polymer and a preparation method thereof will be described in more detail according to specific embodiments of the present invention.

A method of preparing a superabsorbent polymer according to one embodiment of the present invention may include the steps of:

a) mixing a water-soluble ethylenically unsaturated monomer, an internal crosslinking agent, and a polymerization initiator to prepare a monomer composition;

b) polymerizing the monomer composition to prepare a water-containing gel polymer;

c) chopping the water-containing gel polymer;

d) adding one or more fibers of a fluff pulp and a synthetic polymeric fiber to the chopped water-containing gel polymer and mixing them with each other to prepare a mixture;

e) chopping the mixture;

f) drying the mixture; and g) pulverizing the mixture.

In the present invention, to realize an excellent absorption rate while maintaining basic absorption performances of the superabsorbent polymer, one or more fibers of a fluff pulp and a synthetic polymeric fiber are added in the step of chopping the water-containing gel polymer. On the surface of the superabsorbent polymer thus prepared, the fiber having excellent absorbency is adsorbed, and thus an improved absorption rate may be obtained, as compared with the existing superabsorbent polymers. Accordingly, the superabsorbent polymer prepared according to the present invention may exhibit a more improved absorption rate while maintaining basic absorption properties such as water retention capacity.

First, a) a water-soluble ethylenically unsaturated monomer, an internal crosslinking agent, and a polymerization initiator are mixed to prepare a monomer composition.

As the water-soluble ethylenically unsaturated monomer, any monomer commonly used in the preparation of superabsorbent polymers may be used without particular limitation. Here, any one or more monomers selected from the group consisting of anionic monomers and salts thereof, nonionic hydrophilic monomers, and amino group-containing unsaturated monomers and quaternarized products thereof may be used.

Specifically, one or more selected from the group consisting of anionic monomers such as (meth)acrylic acid, maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and salts thereof; nonionic hydrophilic monomers such as (meth) acrylamide, N-substituted (meth)acrylate, 2-hydroxyethyl (meth)acrylate, 2-hydroxypropyl(meth)acrylate, methoxypolyethyleneglycol(meth)acrylate, or polyethyleneglycol (meth)acrylate; and amino group-containing unsaturated monomers such as (N,N)-dimethylaminoethyl(meth)acrylate or (N,N)-dimethylaminopropyl(meth)acrylamide, and quaternarized products thereof may be used.

More preferably, acrylic acid or a salt thereof, for example, acrylic acid or an alkali metal salt thereof such as a sodium salt thereof may be used. When these monomers are used, it is possible to prepare a superabsorbent polymer having more excellent physical properties. When an alkali metal salt of acrylic acid is used as a monomer, acrylic acid may be used after being neutralized with a basic compound such as caustic soda (NaOH).

A concentration of the water-soluble ethylenically unsaturated monomer may be about 20% by weight to about 60% by weight, preferably, about 40% by weight to about 50% by weight with respect to the monomer composition including raw materials of the superabsorbent polymer and solvents, and the concentration may be appropriately controlled by considering a polymerization time, reaction conditions, etc. If the concentration of the monomer is too low, the yield of the superabsorbent polymer may become low, and there may be a problem in terms of economic efficiency. On the contrary, if the concentration of the monomer is too high, there is a process problem that part of the monomers is precipitated, or pulverization efficiency is lowered upon pulverization of the polymerized water-containing gel polymer, and the physical properties of the superabsorbent polymer may be reduced.

As the polymerization initiator used during polymerization in the method of preparing the superabsorbent polymer of the present invention, those generally used in the preparation of superabsorbent polymers may be used without particular limitation.

Specifically, the polymerization initiator may be a thermal polymerization initiator or a photo-polymerization initiator by UV irradiation, depending on the polymerization method. However, even in the case of using the photo-polymerization method, since a certain amount of heat is generated by the ultraviolet irradiation or the like, and a certain degree of heat is also generated according to the progress of the exothermic polymerization reaction, a thermal polymerization initiator may be additionally included.

The photo-polymerization initiator may be used without any limitation as long as it is a compound capable of forming a radical by light such as UV ray.

The photo-polymerization initiator may include, for example, one or more initiators selected from the group consisting of benzoin ether, dialkyl acetophenone, hydroxyl alkylketone, phenyl glyoxylate, benzyl dimethyl ketal, acyl phosphine, and α-aminoketone. Meanwhile, specific examples of the acyl phosphine may include commercially available lucirin TPO, namely, 2,4,6-trimethyl-benzoyl-trimethyl phosphine oxide. More various photo-polymerization initiators are well disclosed in "UV Coatings: Basics, Recent Developments and New Application (Elsevier, 2007)" written by Reinhold Schwalm, p 115, however the photo-polymerization initiator is not limited to the above-described examples.

The photo-polymerization initiator may be included at a concentration of about 0.01% by weight to about 1.0% by weight with respect to the monomer composition. When the concentration of the photo-polymerization initiator is too low, the polymerization rate may become slow, and when the concentration of the photo-polymerization initiator is too high, a molecular weight of the superabsorbent polymer becomes small and its physical properties may become uneven.

Further, as the thermal polymerization initiator, one or more initiators selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate (($NH_4)_2S_2O_8$), etc., and examples of the azo-based initiator may include 2,2-azobis-(2-amidinopropane) dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, 4,4-azobis-(4-cyanovaleric acid), etc. More various thermal polymerization initiators are well disclosed in 'Principle of Polymerization (Wiley, 1981)' written by Odian, p 203, however, the thermal polymerization initiator is not limited to the above-described examples.

The thermal polymerization initiator may be included at a concentration of about 0.001% by weight to about 0.5% by weight with respect to the monomer composition. When the concentration of the thermal polymerization initiator is too low, additional thermal polymerization hardly occurs, and thus effects due to the addition of the thermal polymerization initiator may be insignificant, and when the concentration of the thermal polymerization initiator is too high, the molecular weight of the superabsorbent polymer becomes small and the physical properties may become uneven.

As the internal crosslinking agent, a crosslinking agent having one or more functional groups reactable with a water-soluble substituent of the water-soluble ethylenically unsaturated monomer and one or more soluble ethylenically unsaturated groups; or a crosslinking agent having two or more functional groups reactable with a water-soluble substituent of the monomer and/or a water-soluble substituent formed by hydrolysis of the monomer may be used.

Specific examples of the internal crosslinking agent may include one or more selected from the group consisting of bisacrylamide having 8 to 12 carbon atoms, bismethacrylamide, poly(meth)acrylate of a polyol having 2 to 10 carbon atoms, or poly(meth)allyl ether of a polyol having 2 to 10 carbon atoms. More specific examples thereof may include N,N'-methylene bis(meth)acrylate, ethyleneoxy(meth)acrylate, polyethyleneoxy (meth)acrylate, propyleneoxy(meth) acrylate, glycerin diacrylate, glycerin triacrylate, trimethyloltriacrylate, triallylamine, triarylcyanurate, triallylisocyanate, polyethylene glycol, diethylene glycol, and propylene glycol.

Further, as the internal crosslinking agent, an epoxy compound having one or more epoxy groups may be used. In this regard, the epoxy compound may further include one or more functional groups reactable with the water-soluble ethylenically unsaturated monomer, in addition to the epoxy groups. Specific examples may include polyepoxy compounds such as ethylene glycol diglycidyl ether, polyethylene glycol diglycidyl ether, glycerol polyglycidyl ether, propylene glycol diglycidyl ether, polypropylene glycol diglycidyl ether, etc.

The internal crosslinking agents may be used in combination of two or more thereof, and may be included at a concentration of about 0.01% by weight to about 0.5% by weight with respect to the monomer composition, thereby crosslinking the polymerized polymer.

Meanwhile, in the preparation method of the present invention, the monomer composition may further include additives such as a foaming agent, a foam stabilizer, a thickener, a plasticizer, a preservation stabilizer, an antioxidant, etc., if necessary.

As the foaming agent, an inorganic foaming agent and an encapsulated foaming agent commonly used in the art may be used without limitation.

As the inorganic foaming agent, one or more selected from calcium carbonate ($CaCO_3$), sodium bicarbonate ($NaHCO_3$), ammonium bicarbonate ($NH_4HCO_3$), ammonium carbonate (($NH_4)_2CO_3$), ammonium nitrite ($NH_4NO_2$), sodium hydrogen borohydride ($NaBH_4$), and sodium carbonate ($Na_2CO_3$) may be used, but is not limited thereto.

The encapsulated foaming agent may exist in an encapsulated state during the polymerization of the monomer composition, and may be foamed by heat which is applied during a drying process described below. As a result, pores having a proper size are generated between polymer structures of the superabsorbent polymer, and thus a superabsorbent polymer sheet may exhibit the open pore channel structure. Therefore, when the encapsulated foaming agent is included in the monomer composition, the absorption rate of the superabsorbent polymer may be further improved, which is preferred.

The encapsulated foaming agent may have a structure including a core which contains hydrocarbon and a shell which surrounds the core and is formed using a thermoplastic resin. Such an encapsulated foaming agent may have expansion properties which may vary depending on components constituting the core and the shell, weights of the respective components, particle sizes thereof. By adjusting these factors, it is possible to expand pores to a desired size and to control porosity of the superabsorbent polymer sheet.

Meanwhile, in order to examine whether pores with a desired size are generated, it is necessary to examine expansion properties of the encapsulated foaming agent. However, the foamed shape of the encapsulated foaming agent inside the superabsorbent polymer is difficult to define as one shape, because it may vary depending on the preparation conditions of the superabsorbent polymer. Therefore, the encapsulated foaming agent is first foamed in air, and then its expansion ratio and size are examined, thereby determining whether it is suitable for forming desired pores.

In detail, the encapsulated foaming agent is applied on a glass petri dish, which is then heated in air at 150° C. for 10 minutes to expand the encapsulated foaming agent. In this regard, when the encapsulated foaming agent exhibits a maximum expansion ratio of 3 times to 15 times, 5 times to 15 times, or 8.5 times to 10 times in air, it may be determined as being suitable for forming an appropriate open pore structure in the method of preparing the superabsorbent polymer sheet of the present invention.

The encapsulated foaming agent may have a mean diameter of 5 μm to 50 μm, or 5 μm to 30 μm, or 5 μm to 20 μm, or 7 μm to 17 μm. When the encapsulated foaming agent exhibits the above mean diameter, it may be determined as being suitable for achieving an appropriate porosity.

Further, when the encapsulated foaming agent exhibits a maximum expansion diameter of 20 μm to 190 μm, or 50 μm to 190 μm, or 70 μm to 190 μm, or μm 75 to 190 μm in air, it may be determined as being suitable for forming an appropriate open pore structure in the method of preparing the superabsorbent polymer sheet of the present invention.

The maximum expansion ratio and the maximum expansion diameter in air of the encapsulated foaming agent will be described in more detail in Preparation Examples below.

The hydrocarbon constituting the core of the encapsulated foaming agent may be one or more selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane, and cyclooctane. Among them, hydrocarbons having 3 to 5 carbon atoms (n-propane, n-butane, iso-butane, cyclobutane, n-pentane, iso-pentane, cyclopentane) may be suitable for forming the pores having the above-described size, and iso-butane may be the most suitable.

The thermoplastic resin constituting the shell of the encapsulated foaming agent may be a polymer formed from one or more monomers selected from the group consisting of (meth)acrylate, (meth)acrylonitrile, aromatic vinyl, vinyl acetate, vinyl halide, and vinylidene halide. Among them, a copolymer of (meth)acrylate and (meth)acrylonitrile may be the most suitable for forming the pores having the above-described size.

The encapsulated foaming agent may include the hydrocarbon in an amount of 10% by weight to 30% by weight with respect to the total weight of the encapsulated foaming agent. This range may be the most suitable for forming the open pore structure.

A directly prepared encapsulated foaming agent may be used, or a commercially available foaming agent satisfying the above-described conditions may be used.

Further, the encapsulated foaming agent may be used in an amount of 0.001 part by weight to 10 parts by weight, preferably 0.01 part by weight to 5 parts by weight, and more preferably 0.1 part by weight to 1 part by weight with respect to 100 parts by weight of the water-soluble ethylenically unsaturated monomer. If the content of the encapsulated foaming agent is too low, there are problems in that the open pore structure may not be properly formed. If the content of the encapsulated foaming agent is too high, porosity may be too high, and as a result, strength of the superabsorbent polymer may be weakened. In this respect, the encapsulated foaming agent may be preferably used in the above range of content.

When the encapsulated foaming agent is used, a foam stabilizer may be further included in the monomer composition in order to induce stable foaming.

As the foam stabilizer, an alkyl sulfate salt, an alkyl sulfonate salt, an alkyl phosphate salt, an alkyl carbonate salt, polyethylene glycol alkyl ester, polypropylene glycol alkyl ester, glucoside alkyl ester, glycerol alkyl ester, a block-copolymer of polyethylene glycol and polypropylene glycol, or a mixture thereof may be used. In this regard, the alkyl group may include, but is not particularly limited to, a linear, branched, and cyclic alkyl group having 1 to 30 carbon atoms, etc. Such a foam stabilizer may be included at a concentration of about 0.0001% by weight to 0.1% by weight, or about 0.001% by weight to 0.1% by weight, based on 100% by weight of the monomer composition to improve foaming efficiency of the foaming agent, thereby forming a crosslinked polymer having an appropriate pore structure.

The raw materials such as the above-described water-soluble ethylenically unsaturated monomer, photo-polymerization initiator, thermal polymerization initiator, internal crosslinking agent, and additive may be prepared in the form of a solution in which the monomer composition is dissolved in a solvent.

As the solvent to be applicable, any solvent may be used without limitations in view of constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included in a residual amount excluding the above-described components from the total weight of the monomer composition.

Next, b) the water-containing gel polymer may be prepared by thermal polymerization or photo-polymerization of the monomer composition.

The thermal polymerization or photo-polymerization of the monomer composition is not particularly limited in view of constitution, as long as it is a polymerization method commonly used.

Specifically, the polymerization method is largely classified into the thermal polymerization and the photo-polymerization according to a polymerization energy source. The thermal polymerization may be commonly carried out in a reactor like a kneader equipped with agitating spindles whereas the photo-polymerization may be carried out in a reactor equipped with a movable conveyor belt. The above-described polymerization method is an example only, and the present invention is not limited to the above-described polymerization methods.

For example, the water-containing gel polymer may be obtained by performing thermal polymerization while providing hot air to the above-described reactor like a kneader equipped with the agitating spindles or heating the reactor. The water-containing gel polymer may have a size of centimeters or millimeters when it is discharged from an outlet of the reactor, according to the type of agitating spindles equipped in the reactor. Specifically, the size of the obtained water-containing gel polymer may vary depending on a concentration of the monomer composition fed thereto, a feeding speed or the like, and the water-containing gel polymer having a weight average particle size of 2 mm to 50 mm may be generally obtained.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed. Usually, it is preferable to supply the monomer composition so that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thickness.

The water-containing gel polymer obtained by the above-mentioned method may have a water content of 40% by weight to 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

Next, c) the step of chopping the prepared water-containing gel polymer is performed.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the step (c) may be carried out so that the particle diameter of the water-containing gel polymer becomes about 2 mm to about 20 mm.

Coarse pulverizing of the water-containing gel polymer into a particle diameter of less than 2 mm is not technically easy due to its high water content, and an agglomeration phenomenon between the pulverized particles may occur. Meanwhile, if the polymer is pulverized into a particle diameter of greater than 20 mm, the effect of increasing the efficiency in the subsequent drying step may be insignificant.

Next, the step of d) adding one or more fibers of the fluff pulp and the synthetic polymeric fiber to the chopped water-containing gel polymer and mixing them with each other to prepare a mixture, and the step of e) chopping the mixture again are performed.

When the fiber is added in the step of chopping the water-containing gel polymer, the fiber adsorbed onto the surface of the water-containing gel polymer particle may be incorporated into the interior of the particle by a chopper. Accordingly, at least a portion of the fibers may be incorporated into the interior of the base polymer particle, and the fibers may be distributed both in the exterior and interior of the base polymer particle. As described, the fibers distributed both in the interior and exterior of the base polymer quickly absorb the surrounding moisture through capillary action and transfers it to the polymer. Therefore, the superabsorbent polymer prepared according to the present invention may exhibit an improved initial absorption rate. Further, since such fibers are easy to apply to the process and are inexpensive as well as harmless to the human body, a superabsorbent polymer that is human-friendly and has excellent absorbency may be prepared in a simple and economical manner according to the present invention.

The fluff pulp is a cellulose fluff pulp, and may be, but is not limited to, a wood fluff pulp such as coniferous kraft paper and broadleaf kraft pulp. Fluff pulp used in absorbent articles may be used without limitation.

The synthetic polymeric fiber may be one or more selected from the group consisting of nylon, polypropylene, polyethylene, polyester, polyacrylonitrile, polyvinyl chloride, polyvinyl alcohol, polyacrylate, and acetate. Since the synthetic polymeric fiber has excellent hygroscopic property, and a width or length of the fiber may be easily controlled, the control of physical properties of the superabsorbent polymer may be easy.

The fiber may preferably have a length of 1 mm to 20 mm. Further, the fiber may preferably have a width of 1 μm to 100 μm. If the length of the fiber is too long or the width of the fiber is too wide beyond the above range, a load may be generated during the process of chopping the water-containing gel polymer together with the fiber, and the fiber is hardly adsorbed onto the interior and exterior of the base polymer particle. Thus, it may be difficult to evenly distribute the fibers in the superabsorbent polymer. Further, if the length of the fiber is too short or the width of the fiber is too narrow, the effect of improving the physical properties of the superabsorbent polymer may be insignificant, and thus it is preferable to satisfy the above range.

Meanwhile, as the length and width of the fiber increase within the range that satisfies the above-mentioned length and width, more fibers may be adsorbed onto relatively large water-containing gel polymer particles. In this case, a surface crosslinking solution may be more evenly applied regardless of the particle size variation of the base polymer particles in the subsequent surface crosslinking step, thereby further increasing the surface crosslinking efficiency.

In other words, as the size of the base polymer particles is smaller, their absorption rate for a liquid, i.e., for the surface crosslinking solution is faster. Therefore, the degree of crosslinking may vary depending on the particle size of the base polymer particles, and consequently, variation in the absorption properties between the superabsorbent polymer particles may occur. When more fibers are adsorbed onto the relatively large water-containing gel polymer particles as described above, variation in the absorption rate between the large particles and small particles may reduce due to the adsorbed fibers. Therefore, regardless of the particle size of the base polymer, the coating degree of the surface crosslinking solution becomes uniform, and variation in the degree of crosslinking is reduced, thereby improving the overall physical balance of the superabsorbent polymer to be produced.

To secure these effects, the length of the fiber may be 2 mm or more, or 3 mm or more, and 15 mm or less, or 10 mm or less. For example, fibers having a mean length of 3 mm to 10 mm in which the length of individual fibers satisfy the range of 1 mm to 20 mm may be preferably used. Here, the mean length of the fibers may be obtained by randomly selecting 100 fibers, measuring the lengths of the individual fibers, and calculating the average thereof.

Further, the width of the fiber may be 10 μm or more, 15 μm or more, 30 μm or more, or 50 μm or more, and 90 μm or less, or 80 μm or less.

The content of the fiber may be 1 part by weight or more, 3 parts by weight or more, or 5 parts by weight or more, and 18 parts by weight or less, 15 parts by weight or less, or 10 parts by weight or less with respect to 100 parts by weight of the water-containing gel polymer. If the content of the fiber is less than 1 part by weight with respect to 100 parts by weight of the water-containing gel polymer, it is not possible to secure the effect of improving the absorption rate due to fibers. If the content of the fiber is more than 18 parts by weight with respect to 100 parts by weight of the water-containing gel polymer, basic absorption performances of the superabsorbent polymer to be prepared, such as centrifugal retention capacity (CRC), absorbency under load (AUL), etc., and the absorption rate may be reduced and a mechanical load may be increased in the step of chopping the water-containing gel polymer.

In this regard, the steps d) and e) may be repeated twice to five times. When the steps d) and e) are repeated twice or more, incorporation of the fiber and the water-containing gel polymer may be further improved, and the absorption rate of the resulting superabsorbent polymer may be further improved.

If the steps d) and e) are repeated twice or more, the same amount of the fiber may be added to each repeating cycle to facilitate the mixing, but it is preferable that the total amount of the fiber to be added is within the above range.

Further, in one or more steps of the steps c) to e), water may be further added. When an appropriate amount of water is added in the step of chopping the water-containing gel polymer, a load on the pulverizer may be reduced, and the water-containing gel polymer may be more evenly chopped. Therefore, the particle size of the water-containing gel polymer may be easily controlled. The water may be distilled water. The amount of water added in each step is not particularly limited, but may be, for example, 1 part by weight to 20 parts by weight with respect to 100 parts by weight of the water-containing gel polymer.

The water-containing gel polymer including the fiber, which is finally prepared in step e), may preferably have a particle size in the range of 1 mm to 15 mm. Within the range of the particle size, the efficiency of the drying step may be enhanced.

Next, f) the mixture is dried.

In this regard, a drying temperature of the drying step may be about 150° C. to about 200° C. If the drying temperature is lower than 150° C., the drying time becomes too long and the physical properties of the final superabsorbent polymer may be deteriorated. If the drying temperature is higher than 200° C., only the polymer surface is excessively dried, and thus fine powder may be generated during the subsequent pulverization process and the physical properties of the super absorbent polymer finally formed may be deteriorated. More preferably, the drying may be performed at a temperature of 150° C. to 200° C., and more preferably at a temperature of 160° C. to 180° C.

Meanwhile, the drying step may be carried out for 20 minutes to 1 hour, in consideration of the process efficiency, but is not limited thereto.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation, or ultraviolet irradiation. When the drying step as above is finished, the water content of the polymer may be about 0.1% by weight to about 10% by weight.

Next, g) the dried mixture obtained through the drying step is pulverized.

The polymer powder obtained through the pulverizing step may have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited thereto.

In order to manage the physical properties of the superabsorbent polymer powder that is finally commercialized after the pulverization step, the polymer powder obtained after the pulverization is generally size-sorted depending on the particle diameter. Preferably, the polymer powder is sorted into a polymer having a particle diameter of less than about 150 μm, a polymer having a particle diameter of about 150 μm to about 850 μm, and a polymer having a particle diameter of more than about 850 μm.

Meanwhile, the method of preparing a superabsorbent polymer of the present invention may further include the step h) of adding a surface crosslinking agent to the mixture obtained after the step g), and the step i) of performing a surface cros slinking reaction.

The surface crosslinking step is a step of forming the superabsorbent polymer having more improved physical properties by inducing a crosslinking reaction on the surface of the mixture, i.e., of the polymer including the fiber on the surface thereof in the presence of the surface crosslinking agent. Through this surface crosslinking, a surface-crosslinked layer (surface-modified layer) is formed on the surface of the pulverized polymer particles.

In general, since the surface crosslinking agent is applied on the surface of the superabsorbent polymer particles, the surface crosslinking reaction occurs on the surface of the superabsorbent polymer particles, resulting in improved crosslinkability on the surface of the particles while not substantially affecting the interior of the particles. Hence, the surface-crosslinked superabsorbent polymer particles has a higher degree of crosslinking near the surface thereof than the interior thereof.

As the surface crosslinking agent, surface crosslinking agents which have been used in the preparation of the superabsorbent polymer may be used without particular limitation. More specific examples thereof may include one or more polyols selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3- pentanediol, 2-methyl-2,4-pentanediol, tripropylene glycol, and glycerol; one or more carbonate-based compounds selected from the group consisting of ethylene carbonate and propylene carbonate; epoxy compounds such as ethylene glycol diglycidyl ether; oxazoline compounds such as oxazolidinone, etc.; polyamine compounds; oxazoline compounds; mono-, di-, or polyoxazolidinone compounds; or cyclic urea compounds, etc.

Such a surface crosslinking agent may be used in an amount of about 0.01 part by weight to about 5 parts by weight with respect to 100 parts by weight of the mixture obtained in the step g). The amount of the surface crosslinking agent is controlled within the above-described range, thereby providing a superabsorbent polymer having excellent absorption properties.

The surface crosslinking agent may be dry-mixed with the mixture obtained in the step g) or added in the form of a surface crosslinking solution. As a solvent of the surface crosslinking solution, water, methanol, ethanol, propylene glycol, and combinations thereof may be used, but is not limited thereto.

Meanwhile, in the surface crosslinking step, in addition to the surface crosslinking agent described above, a polyvalent metal salt, an inorganic filler, a thickener, etc. may be further included as needed. These additives may be dry-mixed with the mixture obtained in the step g) or mixed in the form of being added to the surface crosslinking solution.

The polyvalent metal salt may further include, for example, an aluminum salt, more specifically, one or more selected from the group consisting of sulfate, potassium salt, ammonium salt, sodium salt, and hydrochloride of aluminum.

As the polyvalent metal salt is further used, it is possible to further improve liquid permeability of the superabsorbent polymer prepared by the method of one embodiment. The polyvalent metal salt may be added, together with the surface cross-linking agent, to the surface crosslinking solution, and may be used in an amount of 0.01 part by weight to 4 parts by weight with respect to 100 parts by weight of the base polymer.

The inorganic filler may include silica, aluminum oxide, or silicate. The inorganic filler may be included in an amount of 0.01 part by weight to 0.5 parts by weight based on 100 parts by weight of the base polymer powder. Such an inorganic filler may act as a lubricant to improve the coating efficiency of the surface crosslinking solution on the surface of the superabsorbent polymer, and to further improve the liquid permeability of the prepared superabsorbent polymer.

A thickener may be further included in the surface crosslinking step. By further crosslinking the surface of the base polymer powder in the presence of the thickener, it is possible to minimize the deterioration of physical properties even after pulverizing. Specifically, one or more selected from polysaccharides and hydroxy-containing polymers may be used as the thickener. As the polysaccharide, a gum-based thickener and a cellulose-based thickener may be used. Specific examples of the gum-based thickener may include xanthan gum, arabic gum, karaya gum, tragacanth gum, ghatti gum, guar gum, locust bean gum, psyllium seed gum, etc., and specific examples of the cellulose-based thickener may include hydroxypropyl methyl cellulose, carboxymethyl cellulose, methyl cellulose, hydroxymethyl cellulose, hydroxyethyl cellulose, hydroxypropyl cellulose, hydroxyethyl methyl cellulose, hydroxymethyl propyl cellulose, hydroxyethyl hydroxypropyl cellulose, ethyl hydroxyethyl cellulose, methyl hydroxypropyl cellulose, etc. Meanwhile, specific examples of the hydroxy-containing polymer may include polyethylene glycol, polyvinyl alcohol, etc.

The surface crosslinking reaction may be performed by heating the mixture of the pulverized water-containing gel polymer, surface crosslinking agent, and fiber.

The surface crosslinking step may be performed by heating at a temperature of 185° C. or higher, preferably 185° C. to about 230° C. for about 10 min to about 90 min, preferably about min 20 to about 70 min. If the cros slinking reaction temperature is lower than 185° C. or the reaction time is too short, there is a problem in that the surface crosslinking agent does not sufficiently react with the water-containing gel polymer. If the crosslinking reaction temperature is higher than 230° C. or the reaction time is too long, the water-containing gel polymer may be degraded to cause a problem of deterioration of physical properties.

A means for raising the temperature for surface crosslinking reaction is not particularly limited. Heating may be performed by providing a heating medium or by directly providing a heat source. In this regard, the kind of the heating medium applicable may be a hot fluid such as steam, hot air, hot oil or the like, but the present invention is not limited thereto. The temperature of the heating medium to be provided may be properly controlled, taking into consideration the means of the heating medium, the heating rate, and the target temperature. Meanwhile, as the heat source to be directly provided, an electric heater or a gas heater may be used, but the present invention is not limited to these examples.

By the above surface crosslinking reaction step, a surface-modified layer may be formed on the surface of the polymer.

The superabsorbent polymer prepared according to the preparation method of the present invention may include one or more fibers of a fluff pulp and a synthetic polymeric fiber, thereby exhibiting an improved absorption rate.

Accordingly, according to one embodiment of the present invention, provided is a superabsorbent polymer including a base polymer particle including a crosslinked polymer which is obtained by crosslinking polymerization of the water-soluble ethylenically unsaturated monomer in the presence of an internal crosslinking agent, and one or more fibers of a fluff pulp and a synthetic polymeric fiber; and the surface-crosslinked layer which is formed on the surface of the base polymer particle, and is obtained by additionally crosslinking the crosslinked polymer via a surface crosslinking agent, wherein at least a portion of the fibers may be incorporated into the interior of the base polymer particle.

The superabsorbent polymer of the present invention may include the fiber having excellent hygroscopic property in the process of chopping the water-containing gel polymer during the preparation of the base polymer, and therefore, the fiber may be evenly distributed in the interior and exterior of the particle-shaped base polymer. Accordingly, the superabsorbent polymer of the present invention may exhibit excellent basic absorption performances such as water retention capacity and absorbency under load while having improved absorption rate and liquid permeability.

Specifically, the superabsorbent polymer may have water retention capacity (CRC) in the range of about 25 g/g or more, 28 g/g or more, or about 30 g/g or more, and about 45 g/g or less, 40 g/g or less, or about 35 g/g or less, as measured in accordance with EDANA method WSP 241.3.

Further, the superabsorbent polymer may have absorbency under load (AUL) at 0.3 psi of 25 g/g or more, or 27 g/g or more, and 40 g/g or less, or 30 g/g or less, as measured in accordance with EDANA method WSP 242.3.

Further, the superabsorbent polymer may have an absorption rate (vortex time) of 50 sec or less, or 45 sec or less, as measured after adding 2 g of the superabsorbent polymer to 50 mL of physiological saline at 23° C. to 24° C., stirring a magnetic bar (diameter of 8 mm and length of 31.8 mm) at 600 rpm, and measuring a time (sec) taken for vortex to disappear. The lower absorption rate means that the superabsorbent polymer is more excellent. Therefore, the lower limit is not limited, but for example, 10 sec or more, or 20 sec or more.

Meanwhile, according to one embodiment of the present invention, provided is a superabsorbent polymer composition including the superabsorbent polymer particle; and one or more fibers of a fluff pulp and a synthetic polymeric fiber, wherein at least a portion of the fibers may be incorporated into the interior of the superabsorbent polymer particle.

In other words, in the superabsorbent polymer composition, a portion of the fibers may exist in the exterior of the superabsorbent polymer particles, and a portion thereof may be incorporated into the superabsorbent polymer particles. Accordingly, the superabsorbent polymer composition of the present invention may exhibit improved absorption rate, as compared with a composition in which the superabsorbent polymer and the hygroscopic fiber are simply mixed with each other.

Hereinafter, the present invention will be described in more detail with reference to Examples. However, the following Examples are only for illustrating the present invention, and the contents of the present invention are not limited to the following Examples. In addition, unless otherwise specified, "%" and "part" which represent the content in the following Examples and Comparative Examples are "% by weight" and "parts by weight", respectively.

EXAMPLE

Preparation of Superabsorbent Polymer

Examples 1 to 10

100 g of acrylic acid, 3.0 g of polyethylene glycol diacrylate (PEGDA, Mw=523) as a crosslinking agent, 0.008 g of phenylbis(2,4,6-trimethylbenzoyl)phosphine oxide as a photoinitiator, 0.08 g of sodium persulfate (SPS) as a thermal initiator, 128 g of 31.5% caustic soda (NaOH), and 63.5 g of water were mixed to prepare a monomer aqueous solution composition.

The monomer aqueous solution composition was subjected to photo-polymerization reaction to obtain a polymerized sheet. The polymerized sheet was taken out and cut into a size of 3 cm×3 cm. Then, a chopping process was performed using a meat chopper. Specifically, the polymerized sheet was cut and chopped using a meat chopper (hole size of 16 mm, speed of 60 Hz), and then 5 parts by weight of distilled water with respect to 100 parts by weight of the water-containing gel polymer was sprayed thereto. Each fiber in Table 1 below was added in an amount (represented by parts by weight with respect to 100 parts by weight of the water-containing gel polymer) as described in Table 1, and then chopped again using the meat chopper (hole size of 16 mm, speed of 60 Hz). Thereafter, for more even mixing, 5 parts by weight of distilled water was sprayed onto the chopped water-containing gel polymer, and then chopped using the meat chopper (hole size of 16 mm, speed of 60 Hz) to prepare crumbs.

Then, the crumbs were dried in an oven capable of shifting airflow up and down. The crumbs were uniformly dried by flowing hot air at 185° C. from the bottom to the top for 15 minutes and from the top to the bottom for 15 minutes, so that the dried product had a water content of 2% or less. After drying, the crumbs were pulverized using a pulverizer and then classified with an amplitude of 1.5 mm for ten minutes (combination of size-sorting meshes: #20/#30/#50/#100). The respective classified particles (10%/65%/22%/3%) were collected, and a base polymer powder having a particle size of about 150 μm to 850 μm was obtained.

Subsequently, to 100 parts by weight of the prepared base polymer, a surface crosslinking solution (6.2 parts by weight of water, 6.2 parts by weight of methanol, 0.03 parts by weight of ethyleneglycol diglycidyl ether, and 0.01 part by weight of silica (Aerosil A200)) was uniformly mixed, and then subjected to a surface crosslinking reaction at 140° C. for 30 minutes. After completion of the surface treatment, the resultant product was sieved to obtain a superabsorbent polymer having an average particle diameter of 850 μm or less.

Comparative Example 1

A superabsorbent polymer was prepared in the same manner as in Example 1, except that no fiber was added during the process of chopping the water-containing gel polymer.

Comparative Example 2

5 parts by weight of the fluff pulp used in Example 1 was added to 100 parts by weight of the superabsorbent polymer of Comparative Example 1, and mixed with each other to prepare a superabsorbent polymer complex in which the superabsorbent polymer and the fluff pulp were simply mixed.

Experimental Example

Physical properties were evaluated for the superabsorbent polymers of Examples and Comparative Examples by the following methods, and the results are shown in Table 1.

(1) Centrifugal Retention Capacity (CRC)

The water retention capacity by absorption capacity under no load was measured for each polymer in accordance with EDANA WSP 241.3.

In detail, each of the polymers obtained in Examples and Comparative Examples was classified using a sieve of #40-50. After uniformly introducing W0 (g) (about 0.2 g) of the polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight W2 (g) of the bag was measured. Further, after carrying out the same operation without using the polymer, the weight W1 (g) of the bag was measured. CRC (g/g) was calculated using the obtained weights according to the following Equation.

$$CRC(g/g)=\{[W2(g)-W1(g)]/W0(g)\}-1 \qquad \text{[Equation 1]}$$

(2) Absorbency Under Load (AUL)

The absorbency under load of 0.3 psi was measured for each polymer in accordance with EDANA method WSP 242.3. When the absorbency under load was measured, the classified polymer used in the above CRC measurement was used.

In detail, a 400 mesh stainless steel net was installed in the cylindrical bottom of a plastic having an internal diameter of 25 mm W3 (g) (0.16 g) of the superabsorbent polymer was uniformly scattered on the steel net under conditions of room temperature and relative humidity of 50%, and a piston capable of uniformly providing a load of 0.3 psi was put thereon, in which an external diameter of the piston was slightly smaller than 25 mm, there was no gap between the internal wall of the cylinder and the piston, and the jig-jog of the cylinder was not interrupted. At this time, the weight W4 (g) of the apparatus was measured.

After putting a glass filter having a diameter of 90 mm and a thickness of 5 mm in a petri dish having a diameter of 150 mm, a physiological saline composed of 0.9% by weight of sodium chloride was poured until the surface level of the physiological saline became equal to the upper surface of the glass filter. A sheet of filter paper having a diameter of 90 mm was put thereon. The measurement apparatus was mounted on the filter paper, thereby getting the liquid absorbed under the load for 1 hour. 1 hour later, the weight W5 (g) was measured after lifting the measurement apparatus up.

Absorbency under load (g/g) was calculated using the obtained weights according to the following Equation:

$$AUP(g/g)=[W5(g)-W4(g)]/W3(g) \quad \text{[Equation 2]}$$

(3) Absorption Rate (Vortex)

The absorption rate of each polymer was measured in seconds according to the method described in International Publication WO 1987-003208.

In detail, 2 g of the superabsorbent polymer was added to 50 mL of physiological saline at 23° C. to 24° C., and stirred with a magnetic bar (diameter of 8 mm and length of 31.8 mm) at 600 rpm, and a time taken for vortex to disappear was measured in seconds to calculate the absorption rate (vortex time).

TABLE 1

| | Fiber | | | | Physical properties of superabsorbent polymer | | |
|---|---|---|---|---|---|---|---|
| | Kind | Width (μm) | Mean length* (mm) | Content (parts by weight) | CRC (g/g) | 0.3 psi AUL (g/g) | Vortex (sec) |
| Example 1 | Fluff pulp | 30-50 | 5 | 1 | 33.8 | 27.9 | 46 |
| Example 2 | Fluff pulp | 30-50 | 5 | 3 | 33.5 | 27.7 | 43 |
| Example 3 | Fluff pulp | 30-50 | 5 | 5 | 33.2 | 27.6 | 39 |
| Example 4 | Fluff pulp | 30-50 | 5 | 7.5 | 32.7 | 27.2 | 36 |
| Example 5 | Fluff pulp | 30-50 | 5 | 10 | 32.1 | 26.8 | 32 |
| Example 6 | Fluff pulp | 15-25 | 3 | 5 | 33.7 | 27.9 | 40 |
| Example 7 | Fluff pulp | 50-80 | 8 | 5 | 32.1 | 27.6 | 40 |
| Example 8 | PP | 10-30 | 3 | 5 | 33.4 | 27.9 | 37 |
| Example 9 | PVA | 10-30 | 6 | 5 | 32.6 | 26.7 | 38 |
| Example 10 | Nylon | 10-30 | 3 | 5 | 32.9 | 26.8 | 26 |
| Comparative Example 1 | — | | | 0 | 34.0 | 28.0 | 70 |
| Comparative Example 2 | (Surface-crosslinked superabsorbent polymer mixed with pulp of Example 1) | | | 5 | 32.3 | 24.7 | 65 |

*The mean length of the fiber was obtained by randomly selecting 100 fibers and then calculating the mean value of the lengths thereof.

Referring to Table 1, it was confirmed that the superabsorbent polymers prepared according to the present invention have excellent basic physical properties such as CRC, AUL, etc. while exhibiting a remarkably improved absorption rate, as compared with Comparative Example 1 including no fiber and Comparative Example 2 in which the prepared superabsorbent polymer and the pulp fiber were simply mixed.

The invention claimed is:

1. A method of preparing a superabsorbent polymer, the method comprising:
    a) mixing a water-soluble ethylenically unsaturated monomer, an internal crosslinking agent, and a polymerization initiator to prepare a monomer composition;
    b) polymerizing the monomer composition to prepare a water-containing gel polymer;
    c) chopping the water-containing gel polymer;
    d) adding one or more fibers of a fluff pulp and a synthetic polymeric fiber to the chopped water-containing gel polymer and mixing them with each other to prepare a mixture;
    e) chopping the mixture;
    f) drying the mixture; and
    g) pulverizing the mixture,
    wherein the fiber has a length of 1 mm to 20 mm.

2. The method of preparing a superabsorbent polymer of claim 1, wherein the fiber is included in an amount of 1 part by weight to 18 parts by weight with respect to 100 parts by weight of the water-containing gel polymer.

3. The method of preparing a superabsorbent polymer of claim 1, wherein the fiber has a width of 1 μm to 100 μm.

4. The method of preparing a superabsorbent polymer of claim 1, wherein water is further added in one or more of c) to e).

5. The method of preparing a superabsorbent polymer of claim 4, wherein the water is added in an amount of 1 part by weight to 20 parts by weight with respect to 100 parts by weight of the water-containing gel polymer.

6. The method of preparing a superabsorbent polymer of claim 1, wherein the monomer composition further includes a foaming agent.

7. The method of preparing a superabsorbent polymer of claim 6, wherein the monomer composition further includes one or more foam stabilizers selected from the group consisting of alkyl sulfate salts, alkyl sulfonate salts, alkyl phosphate salts, alkyl carbonate salts, polyethylene glycol alkyl ester, polypropylene glycol alkyl ester, glucoside alkyl ester, glycerol alkyl ester, and block-copolymers of polyethylene glycol and polypropylene glycol.

8. The method of preparing a superabsorbent polymer of claim 1, further comprising, after g), h) adding a surface crosslinking agent to the mixture obtained in g); and i) performing a surface crosslinking reaction.

9. The method of preparing a superabsorbent polymer of claim 8, wherein the surface crosslinking agent is one or more selected from the group consisting of a polyhydric alcohol compound; an epoxy compound; a polyamine compound; a haloepoxy compound; a condensation product of a haloepoxy compound; an oxazoline compound; a mono-, di-, or polyoxazolidinone compound; a cyclic urea compound; a polyvalent metal salt; and an alkylene carbonate compound.

10. The method of preparing a superabsorbent polymer of claim 8, wherein the surface crosslinking agent is added in an amount of 0.001 part by weight to 5 parts by weight with respect to 100 parts by weight of the mixture.

* * * * *